United States Patent [19]

Hewitt

[11] Patent Number: 4,771,958

[45] Date of Patent: Sep. 20, 1988

[54] APPARATUS AND METHOD FOR SIMULTANEOUSLY WINDING TWO STRANDS OF WIRE ON A BOBBIN

[75] Inventor: Richard P. Hewitt, Hemet, Calif.

[73] Assignee: Bourns Instruments, Inc., Riverside, Calif.

[21] Appl. No.: 77,138

[22] Filed: Jul. 23, 1987

[51] Int. Cl.$^4$ .............................................. H01F 11/04
[52] U.S. Cl. .................................. 242/7.03; 242/7.08; 242/7.11
[58] Field of Search ...................... 242/7.03, 7.06–7.11, 242/7.14–7.16

[56] References Cited

U.S. PATENT DOCUMENTS

| | | | |
|---|---|---|---|
| 2,742,238 | 4/1956 | Clark et al. | 242/7.16 |
| 3,801,029 | 4/1974 | Malburg | 242/7.03 |
| 4,007,881 | 2/1977 | Haslau et al. | 242/4 B |
| 4,256,268 | 3/1981 | Fahrbach | 242/7.11 |
| 4,553,705 | 11/1985 | Uchida et al. | 242/4 R |

Primary Examiner—David Werner
Attorney, Agent, or Firm—Howard J. Klein; William G. Becker

[57] ABSTRACT

An apparatus for winding two coils simultaneously on a bobbin, such as winding the two secondary coils of a linear variable differential transformer (LVDT), has a chuck or the like holding a bobbin. The chuck is rotated by a first motor. First and second wire guides move linearly in directions opposite to one another along the axis of rotation of the bobbin, and guide two strands of wire onto the rotating bobbin. The wire guides arrive simultaneously at the longitudinal center of the bobbin where the two strands of wire cross one another. The two wire guides are driven by two lead screws which rotate at identical speeds but in opposite directions to one another. The lead screws are driven by a second motor. The speeds of rotation of both motors are controlled by a computer, whereby the pitch pattern of the windings is determined by a computer program.

30 Claims, 2 Drawing Sheets

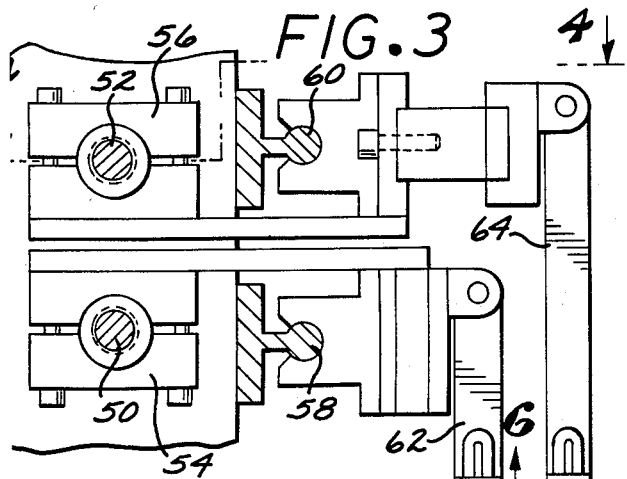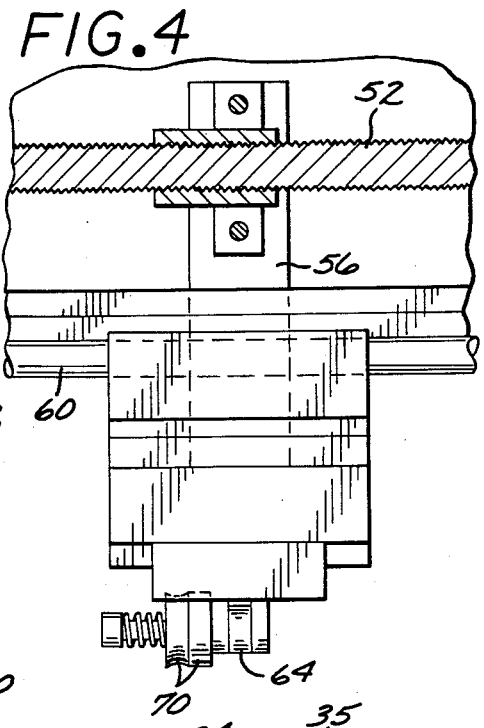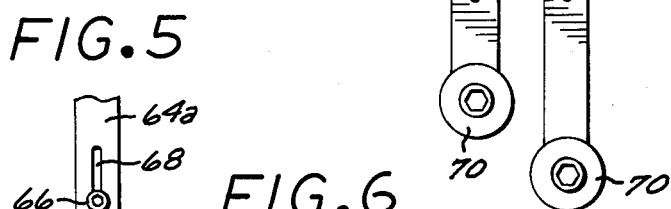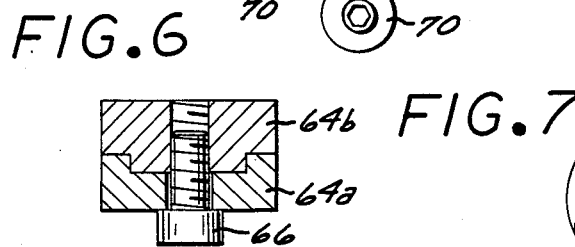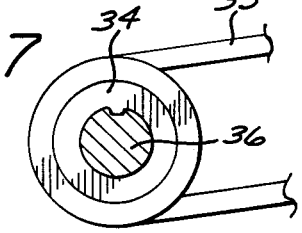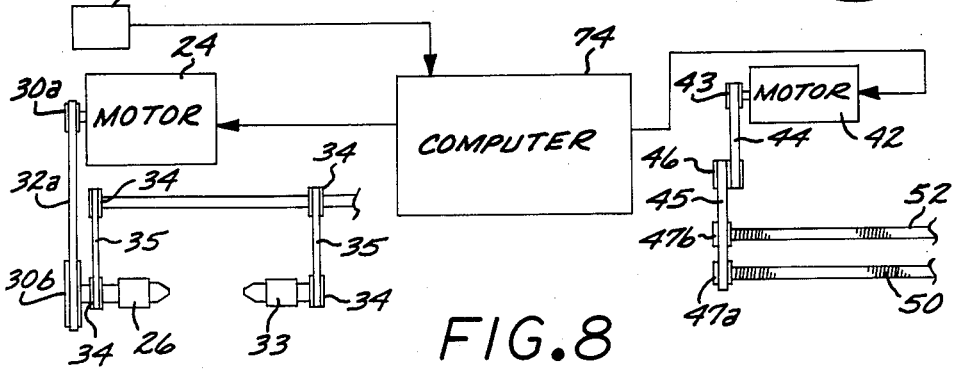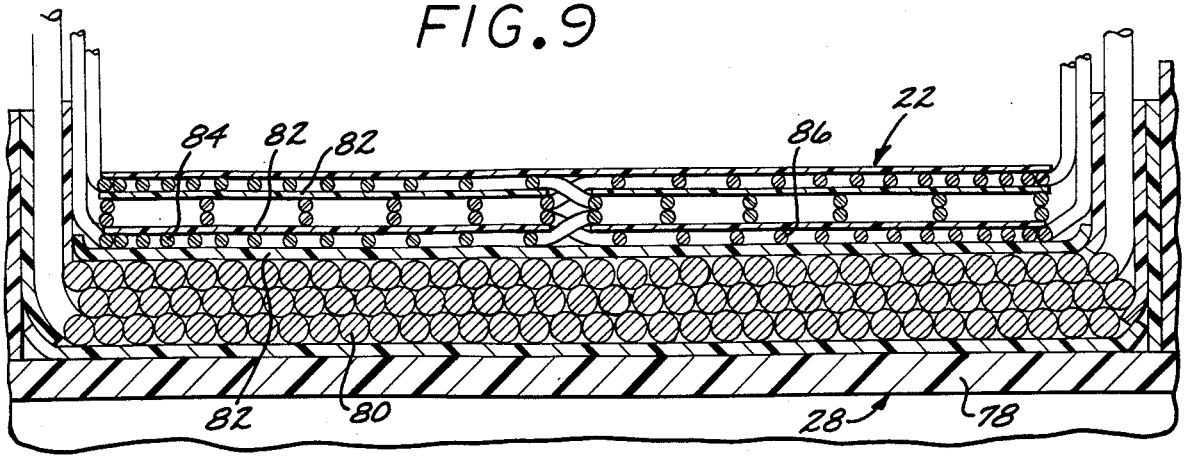

APPARATUS AND METHOD FOR SIMULTANEOUSLY WINDING TWO STRANDS OF WIRE ON A BOBBIN

BACKGROUND OF THE INVENTION

1. Field of the Invention

The present invention is directed to an apparatus and method for winding wire coils onto a bobbin or spool. More particularly, the present invention is directed to an apparatus and method for winding two strands of wire on a bobbin in a configuration which is particularly advantageous for constructing linear variable differential transformers.

2. Brief Description of the Prior Art

Coil winding machines of various types are well known in the prior art. One basic type of coil winding machine of the prior art has a motor-driven, rotating chuck which holds a bobbin or spool onto which a strand of wire is to be wound. A wire guide mechanism is mounted in the proximity of the bobbin. The guide mechanism is moved in a reciprocating, back and forth motion along and parallel with the axis of rotation of the bobbin.

A variation of this type of coil winding machine has several wire guides, each of which is placed in a different position along the longitudinal axis of a bobbin or spool, so that several coils are wound simultaneously. After the windings are complete, the bobbin is usually cut to provide individual coils.

In another basic type of coil winding machine of the prior art, the bobbin or spool is held substantially motionless. One or more circularly moving or orbiting flyer arms deposit one or more strands of wire on the bobbin.

These and other examples of prior art coil winding machines can be found in U.S. Pat. Nos. 2,742,238; 3,801,029; 4,007,881; 4,256,268; and 4,553,705.

More specifically, among the foregoing patents, U.S. Pat. No. 2,742,238 describes a coil winding machine which winds a plurality of axially aligned coils on a single arbor.

U.S. Pat. No. 3,801,029 describes an apparatus and method wherein wires from two spools are wound onto a rotating mandrel to form primary and secondary windings on top of one another. An insulating layer separates the primary and secondary windings. The wires which form the primary and secondary winding procedures do not cross one another during the winding process.

U.S. Pat. Nos. 4,007,881 and 4,553,705 disclose examples of winding apparatus where the winding procedures are controlled by a computer.

U.S. Pat. No. 4,256,268 discloses a coil winding apparatus wherein two to four strands of wire may be simultaneously wound on a mandrel. In this apparatus a winding head uses separate rotating and reciprocating flyer arms for placing each strand of wire on the mandrel.

One important application of the coil winding devices of the prior art is the making of linear variable differential transformers, or "LVDTs", as they are known in the art.

As is well known, LVDTs are, basically, position sensors. They operate on the principle that a ferromagnetic core is moved through the interior of a hollow bobbin onto which a single primary and two secondary windings are placed. The magnitude of the magnetic coupling of the coils to one another depends on the position of the movable core. Voltage and phase shift measurements, which may be obtained by comparing the outputs of the two secondary windings with the input to the primary winding, are indicative of the position of the movable core.

In one relatively advanced form of prior art LVDTs, the pitch of each of the two secondary windings varies along the length of the bobbin. One secondary winding is, however, disposed on top of the other. A disadvantage of such an LVDT is that the two secondary windings are not equidistant from the core. Therefore, in order to obtain accurate measurements, the varying pitch of the secondary windings must be properly adjusted to compensate for the differences in the distances of the two secondary windings from the core.

In light of the foregoing, there is a definite need in the prior art for a coil winding apparatus and method which is capable of winding improved LVDTs. The present invention provides such apparatus and method.

SUMMARY OF THE INVENTION

It is an object of the present invention to provide an apparatus and method for winding two strands of wire on a bobbin, primarily as the secondary windings of linear variable differential transformers, wherein the distance of the two windings from the longitudinal axis of the transformer is substantially the same.

It is another object of the present invention to provide an apparatus and method for winding two strands of wire on a bobbin, primarily as the secondary windings of linear variable differential transformers, wherein the wires of the two secondary windings cross one another.

The foregoing and other objects and advantages are attained by an apparatus which includes a motor operatively connected to a chuck or the like which rotates a bobbin or core upon which two strands of wire are to be wound simultaneously.

A first wire guide is moved in a reciprocating lateral motion along the bobbin, parallel with the axis of rotation of the bobbin, whereby a first strand of wire is wound on the bobbin. A second wire guide is also moved in a reciprocating parallel motion along the bobbin, parallel with the rotational axis of the bobbin, whereby a second strand of wire is also wound on the bobbin. The motions of the first and second wire guides are coordinated so that the two are always moving in directions opposite to one another whereby the two strands of wire cross one another substantially at the center of the bobbin.

The present invention can be best understood, together with further objects and advantages, from the following specification, taken together with the accompanying drawings

BRIEF DESCRIPTION OF THE DRAWINGS

FIG. 3 is a cross-sectional view, the cross-section being taken on lines 3,3 of FIG. 1;

FIG. 4 is a cross-sectional view, the cross-section being taken on lines 4,4 of FIG. 3;

FIG. 5 is a partial rear view of the wire guide arm shown in FIG. 3;

FIG. 6 is a cross-sectional view of the wire guide arm, the cross-section being taken on lines 6,6 of FIG. 3;

FIG. 7 is a cross-sectional view of a drive axle of a tailstock used in the apparatus, the cross-section being taken on lines 7,7 of FIG. 2;

FIG. 8 is a schematic representation, partly in block diagram, of the apparatus of the present invention, and FIG. 9 is a cross-sectional view of the primary, and two secondary, coils of a linear variable differential transformer made with the apparatus of the present invention, and in accordance with the process of the present invention.

DESCRIPTION OF THE PREFERRED EMBODIMENT

The following specification, taken in conjunction with the drawings, sets forth the preferred embodiment of the present invention. The embodiment of the invention disclosed herein is the best mode contemplated by the inventor for carrying out his invention in a commercial environment, although it should be understood that various modifications can be accomplished within the scope of the present invention.

Figure 1:
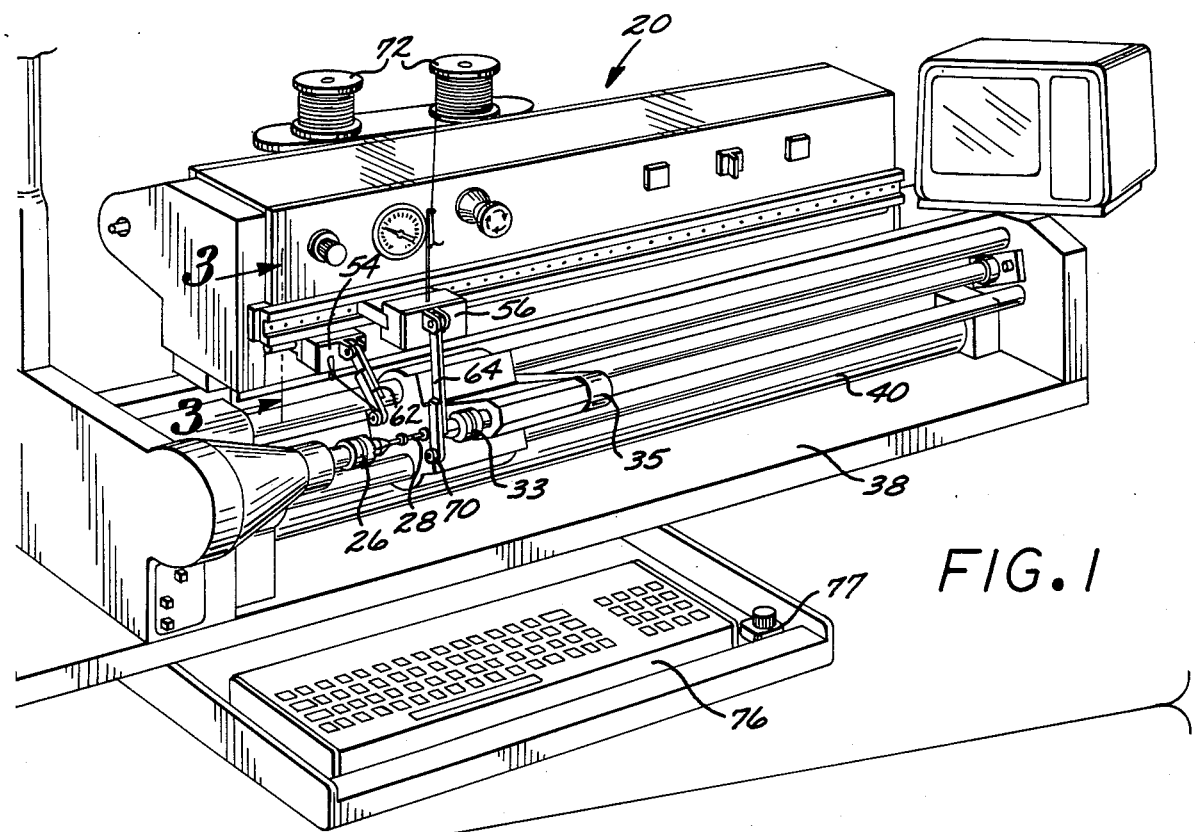
FIG. 1 is a perspective view of a preferred embodiment of the apparatus of the present invention.
Figure 2:
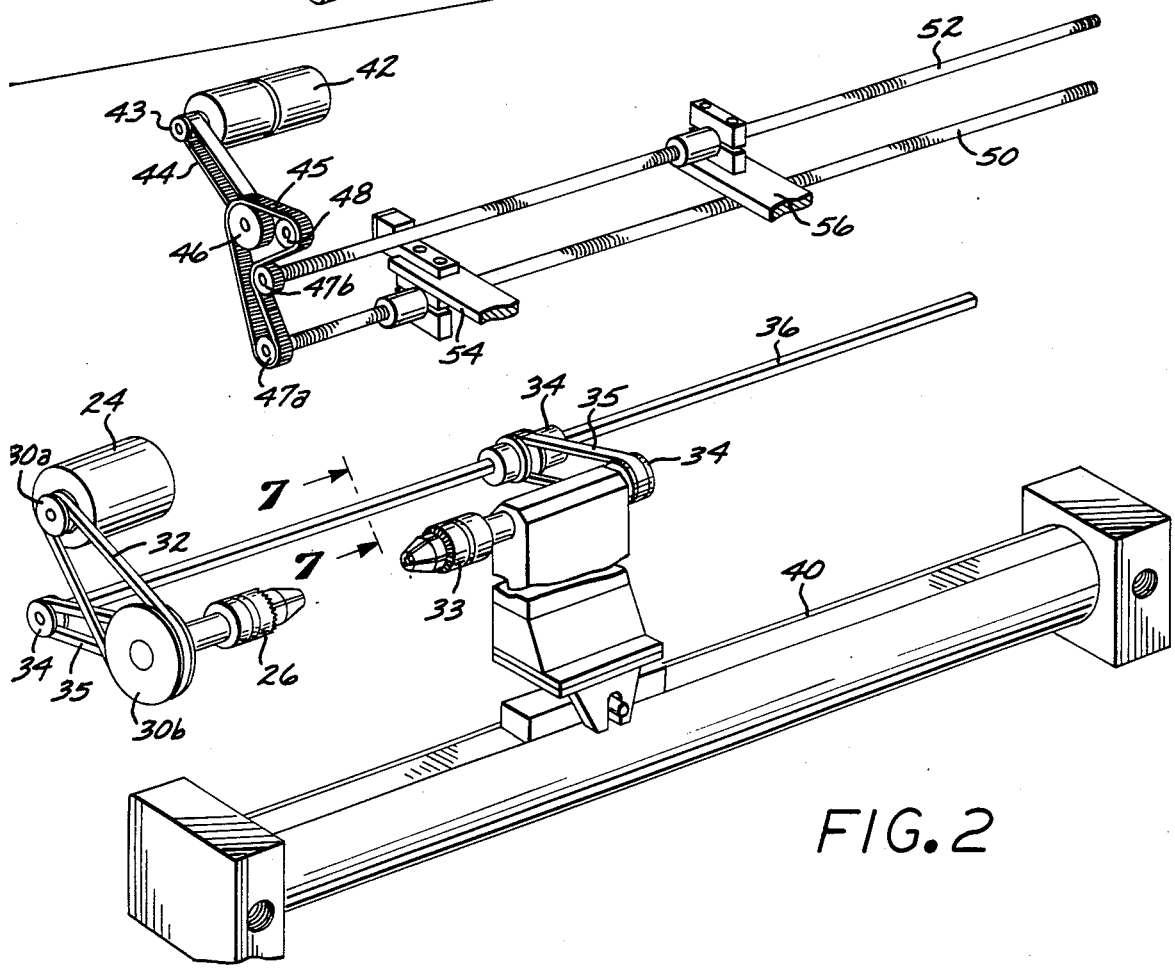
FIG. 2 is an exploded perspective view schematically showing the apparatus of the present invention.

Referring now to the drawing Figures, and particularly to FIGS. 1, 2, and 8, a preferred embodiment 20 of the coil winding apparatus or machine of the present invention is disclosed. As noted above, the coil winding apparatus 20 of the present invention is primarily designed, and is particularly well adapted for, winding two secondary windings of a linear variable differential transformer (LVDT), an example of which is partially shown in FIG. 9 and designated by the numeral 22. Therefore, the invention is described below primarily in connection with the winding of such LVDTs. Nevertheless, it should be kept in mind that, in view of the broad generic principles disclosed herein, those skilled in the art may readily adapt and utilize the apparatus of the present invention for purposes other than winding LVDTs.

As best shown in FIGS. 1, 2, and 8, the coil winding apparatus 20 includes a first electric motor 24 which rotates a chuck 26 adapted to hold a bobbin 28. The first motor 24 rotates the chuck 26 through a pair of drive pulleys 30a and 30b linked by a main drive belt 32. The first motor 24 also actively drives a rotating tailstock 33 which is also adapted to hold the bobbin 28. The tailstock 33 is driven by the first motor 24 through an arrangement of pulleys 34 and belts 35, linked by a slotted shaft 36, the latter being shown in cross-section in FIG. 7. As is common practice in the art of constructing coil winding machines, the tailstock 33 is slideably mounted relative to the chassis 38 of the apparatus 20. In this connection, it is noted that the preferred embodiment 20 of the coil winding machine of the present invention may be constructed from component parts and elements generally known in the art. Specifically, the preferred embodiment 20 may be constructed by modifying commercially available state-of-the-art coil winding machines, such as, for example, the BACHI Model No. 215 coil winder, which is well known to those skilled in the art. In fact, the apparatus shown in FIG. 1 of the drawings is a modification, in accordance with the novel principles of the present invention, of the BACHI Model No. 215 coil winder.

It was found advantageous within the practice of the present invention to exert a moderate force on the slideably mounted tailstock 33 in a direction pulling it away from the chuck 26 so as to cause the bobbin 28 to be under moderate tension while wire is being wound thereon. This is accomplished in the apparatus of the present invention by including, in the chassis 38, a state-of-the-art rodless air cylinder 40, such as the commercially available ORIGA Series P120 cylinder. The air cylinder 40, the construction of which, per se, does not form any part of the present invention, is best shown in FIG. 2.

Referring still primarily to FIGS. 1, 2, and 8, wire guides, carriages for wire guides, and a mechanism for actuating the wire guides in accordance with the principles of the present invention, are disclosed.

More particularly, the apparatus 20 of the present invention includes a second electric motor 42, having an output shaft 43 which drives, through a drive belt 44, a lead screw rotating mechanism comprising an appropriately positioned timing belt 45, a drive pulley 46, a pair of counter-rotating pulleys 47a and 47b, and an idler pulley 48. The first counter-rotating pulley 47a is connected to a first lead screw 50, and the second counter-rotating pulley 47b is connected to a second lead screw 52. The positioning and dimensions of the timing belt 45, the drive pulley 46, the counter-rotating pulleys 47a and 47b, and the idler pulley 48 are such that the first and second lead screws 50 and 52 rotate at identical speeds but always in directions opposite to one another. The lead screws 50 and 52, and also the second electric motor 42, are mounted to the chassis 38 of the apparatus 20.

The first lead screw 50 drives, or, more accurately stated, causes to move, a first wire guide carriage 54 along a longitudinal axis which is parallel with the axis of rotation of the bobbin 28. The second lead screw 52 is mounted to rotate in an axis parallel with the axis of rotation of the first lead screw 50. The second lead screw 52 causes to move a second wire guide carriage 56 parallel with the first wire guide carriage 54. Mounting of the wire guide carriages 54 and 56 on the respective lead screws 50 and 52 is also shown in the cross-sectional views of FIGS. 3 and 4. FIGS. 3 and 4 also show that two fixedly mounted rails 58 and 60 are included in the apparatus 20 of the present invention. The first and second wire guide carriages 54 and 56 are slideably mounted on these first and second rails 58 and 60, respectively. In this regard it is noted that the construction of the wire guide carriages and their mounting on lead screws and rails, per se, may be accomplished in accordance with the state-of-the-art. However, the mounting and operation of two lead screws and two wire guide carriages in the herein-described manner is considered novel and innovative.

Referring now primarily to FIGS. 1 and 3 to 6, each wire arm carriage carries a wire guide arm of adjustable length. The wire guide arms carried by the first and second carriages 54 and 56, respectively, bear the reference numerals 62 and 64. FIGS. 5 and 6 illustrate the assembly of the wire guide arm 64 in detail. The assembly has two parts 64a and 64b secured to one another by a bolt 66 fitted in an elongated slot 68. This construction permits adjustment of the length of the wire guide arms.

The wire guide arms 62 and 64 each terminate in a wire guide finger which has a pair of spring-biased discs 70. The discs 70 hold, under a light spring force, a thin strand of wire which is to be wound on the bobbin 28. It will be readily understood by those skilled in the art that the wire can readily move between the discs 70. As the wire is wound onto the bobbin 28, it is gradually unraveled from one of a pair of spools 72 which are conveniently placed on the top of the apparatus 20. Each of the spools 72 feeds its wire to one of the wire guide arms 62 and 64.

It is an important novel feature of the present invention that the two wire guide arms 62 and 64 always move in directions opposite to one another. In the preferred embodiment, this is accomplished through the respective lead screws 50 and 52 which always rotate in opposite directions to one another, and accordingly carry the respective wire guide carriages 54 and 56 in opposite directions. The lead screws 50 and 52, the wire guide carriages 54 and 56, and the wire guide arms 62 and 64 are spaced in such a manner that both wire guide arms 62 and 64 can simultaneously move in reciprocating linear motions, in directions opposite to one another and still parallel with the rotating bobbin 28. The two wire guide arms 62 and 64 arrive substantially simultaneously at the longitudinal center of the bobbin 28. Thus, during each full length of travel of a wire guide arm along the bobbin 28, the wire wound by that arm to the bobbin 28 crosses the wire wound by the other arm.

The diagrammatic and schematic view of FIG. 8 shows a computer 74 which controls the speed of rotation of the bobbin 28 and the speed of tne linear motions of the two wire guide carriages 54 and 56. In other words, the computer 74 controls the pitch of the windings which are deposited on the bobbin 28. In this connection it is noted that controlling the pitch of the windings in accordance with a computer program, pe se, is not novel. The above-noted state-of-the-art BACHI Model No. 215 coil winding apparatus, for example, may also be controlled by a computer program. In light of the foregoing, the role and operation of the computer 74 is described here only to the extent necessary to explain the present invention.

Briefly summarized then, the computer 74 itself is controlled by a program which may be actuated and changed by appropriate input at the keyboard 76. The program contains information regarding the winding to be performed, for example, the desired speed of rotation of the first motor 24 and of the bobbin 28, the length of linear travel of the wire guide carriages 54 and 56, and the starting positions of such travel. In accordance with the state-of-the-art, apparatus 20 also includes encoders (not shown) which act as sensors and detect the positions of the wire guide carriages 54 and 56 and the speeds of rotation of the first and second electric motors 24 and 42. The encoders (not shown) input this information into the computer 74. The program used in connection with the apparatus and process of the present invention is designed to vary the speed of the wire guide carriages 54 and 56 in accordance with a predetermined pattern which is required for the particular coil to be wound on the apparatus. In other words, the computer program permits variations in the pitch of the windings in accordance with a predetermined program. A pattern having a pitch which gradually changes along the length of the bobbin 28 is shown on FIG. 9, and is described in somewhat more detail below.

A potentiometer 77 is incorporated in the apparatus of the present invention to permit direct manual control of the first electric motor 24. The encoders (not shown) input the speed of the first motor 24 into the computer 74. In accordance with the programs used in accordance with the preferred embodiment of the invention, the computer 74 changes the speed of the second motor 42 whenever the speed of the first motor 24 is changed. This is done in order to maintain a programmed ratio of the respective speeds of the rotations of the two motors 24 and 42. Accordingly, in the herein-described preferred embodiment of the apparatus 20 of the invention, the winding process can be manually slowed down, or temporarily halted, without affecting the computer program. The program itself, just like the basic BACHI Model No. 215 coil winding apparatus, is available commercially.

Referring now specifically to FIG. 9, an LVDT 22 wound in accordance with the present invention is shown schematically. A hollow core 78 of a bobbin 28 has a primary coil 80 wound thereon. The winding of the primary coil 80 does not require any of the novel features of the apparatus or process of the present invention. A layer of insulating material, such as insulating tape 82, is placed on the top of the primary coil 80. Thereafter, a first secondary coil and a second secondary coil of the LVDT 22 are wound on the apparatus 20 of the present invention.

The foregoing is accomplished by causing the first and second wire guide arms 62 and 64, respectively, to start the winding process from the two opposite ends of the bobbin 28. For illustration, the two strands of wire deposited on the bobbin 28 have different cross-hatchings on the schematic view of FIG. 9, and respectively bear the reference numerals 84 and 86. When the two wire guide arms 62 and 64 simultaneously reach the center of the bobbin 28, the two wires 84 and 86 cross one another. At this, it is advantageous, although not always necessary in accordance with the present invention, to interrupt the winding process and place a layer of tape 82 on the top of each winding which has been deposited. Thereafter, the winding is continued so that each wire guide arm travels to the end of the bobbin 28 and still later moves back in the reverse direction. At the point the wire guide arms are aligned with the center of the bobbin 28, the wires 84 and 86 cross one another again, and another layer of insulating tape 82 is again deposited. In this manner the winding is continued for as long as necessary to place the required number of turns on the bobbin 28.

The pitch of the windings is varied in accordance with a computer program to obtain a predetermined pitch pattern. In the LVDT shown on FIG. 9 this pattern requires the first wire 84 to have a pitch which gradually increases (the spacing of the windings increases) from the left end of the bobbin 28 to the right end. The second wire 86 has the opposite pitch pattern, its pitch gradually decreasing from left to right. In other LVDTs different pitch patterns may be incorporated; what is important in accordance with the present invention is that the wires cross over substantially in the center of the overall winding which is to be obtained.

Several modifications of the present invention may become readily apparent to those skilled in the art in light of the foregoing disclosure. In accordance with one apparent modification, the two lead screws may be driven by two different motors, although the motors are still controlled by a computer, and the two lead screws still cause the two wire arms to move in opposite directions whereby the two wires cross one another substantially in the center of the overall winding to be obtained.

The scope of the present invention should be interpreted solely from the following claims as such claims are read in light of the disclosure.

What is claimed is:

1. An apparatus for winding wire in coils on a bobbin, the apparatus comprising:

means for rotating the bobbin;

first wire guide means for guiding a first strand of wire onto the rotating bobbin;

first carriage means for imparting reciprocating lateral motion to the first wire guide means, said motion being in a direction parallel with the axis of rotation of the bobbin;

second wire guide means for guiding a second strand of wire onto the rotating bobbin, and second carriage means for imparting reciprocating lateral motion to the second wire guide means, said motion being in a direction parallel with the axis of rotation of the bobbin, the first and second wire guide means and the first and second carriage means jointly being adapted so that the respective motions imparted to the first and second carriage means are in opposite directions to one another and so that the first and second strands of wire cross one another while being wound on the bobbin each time the respective first and second carriage means move past the longitudinal center of the bobbin.

2. The apparatus of claim 1 wherein the means for rotating the bobbin comprise a rotating chuck driven by a first motor.

3. The apparatus of claim 2 wherein the means for rotating the bobbin further comprise a rotating tailstock which is also driven by the first motor.

4. The apparatus of claim 3 further including means for applying a force in a direction parallel with the axis of rotation of the bobbin against the rotating tailstock whereby the rotating bobbin is kept under tension.

5. The apparatus of claim 4 wherein the means for applying force is an air cylinder.

6. The apparatus of claim 2 wherein the first carriage means include a first wire guide carriage carrying the first wire guide means, a first rail on which the first wire guide carriage is mounted for lateral sliding motion, and a first lead screw rotated by a second motor and mounted to the first wire guide carriage to move the first wire guide carriage on the first rail, and wherein the second carriage means include a second wire guide carriage carrying the second wire guide means, a second rail on which the second wire guide carriage is mounted for lateral sliding motion, and a second lead screw rotated by the second motor and mounted to the second wire guide carriage to move the second wire guide carriage on the second rail, the first and second lead screws being rotated in opposite directions.

7. The apparatus of claim 6 further including computer means adapted for providing a programmed input into the second motor, whereby the speed of rotation of the first and second lead screws and thereby the lateral motions of the first and second wire guide carriages is controlled by a program so that the first and second wires wound on the bobbin have pitches of winding which are controlled by the program.

8. The apparatus of claim 7 wherein the computer means are also adapted for providing a controlled input into the first motor, whereby the speed of rotation of the first motor is controlled by the program.

9. The apparatus of claim 8 further comprising additional means for manually regulating the speed of the first motor.

10. The apparatus of claim 9 wherein the additional means comprise a potentiometer.

11. An apparatus for simultaneously winding two strands of wire on a bobbin, the apparatus comprising:

a first motor operatively connected to means for rotating the bobbin;

first wire guide means for guiding a first strand of wire onto the rotating bobbin;

first carriage means for imparting reciprocating lateral motion to the first wire guide means, said motion being in a direction parallel with the axis of rotation of the bobbin;

a second motor operatively connected to the first carriage means for moving the first carriage means;

second wire guide means for guiding a second strand of wire onto the rotating bobbin, and second carriage means for imparting reciprocating lateral motion to the second wire guide means, said motion being in a direction parallel with the axis of rotation of the bobbin, the second carriage means being operatively connected to and being moved by the second motor, the first and second wire guide means and the first and second carriage means jointly being adapted so that the respective motions imparted to the first and second carriage means are in opposite directions to one another and so that the first and second strands of wire cross one another while being wound on the bobbin each time the respective first and second carriage means move past the longitudinal center of the bobbin.

12. The apparatus of claim 11 wherein the means for rotating the bobbin include a chuck rotated by the first motor.

13. The apparatus of claim 12 wherein the means for rotating the bobbin further include a tailstock which is driven by the first motor.

14. The apparatus of claim 11 further including means for varying, in accordance with a predetermined program, the velocity of the reciprocating lateral motions of the first and second carriage means.

15. The apparatus of claim 14 wherein the means for varying, in accordance with a predetermined program, comprises a computer.

16. The apparatus of claim 11 further comprising first and second lead screws, each of the lead screws being operatively connected to the respective first and second carriage means to move said first and second carriage means, respectively, the lead screws being mounted to be rotated by the second motor at speeds which are identical to one another and in directions opposite to one another.

17. The apparatus of claim 16 wherein the second motor includes a rotating shaft which engages a timing belt, and wherein the same timing belt drives each of the first and second lead screws.

18. The apparatus of claim 16 further comprising first and second rail means, each rail means being adapted for slideably mounting the respective first and second carriage means.

19. An apparatus for simultaneously winding two strands of wire on a bobbin, the apparatus comprising:

a first motor operatively connected to means for rotating the bobbin, said means including a chuck and a tailstock, each of which is adapted for holding the bobbin;

first wire guide means for guiding a first strand of wire onto the rotating bobbin;

a first fixedly mounted rail;

first carriage means for imparting reciprocating lateral motion to the first wire guide means, said motion being in a direction parallel with the axis of rotation of the bobbin, the first carriage means being slideably mounted on the first rail;

a first rotatably mounted lead screw operatively connected to the first carriage means for imparting the reciprocating lateral motion to the first carriage means;

a second motor operatively connected to the first lead screw for rotating the first lead screw;

second wire guide means for guiding a second strand of wire onto the rotating bobbin;

a second fixedly mounted rail;

second carriage means for imparting reciprocating lateral motion to the second wire guide means, said motion being in a direction parallel with the axis of rotation of the bobbin, the second carriage means being slideably mounted on the second rail, and a second rotatably mounted lead screw operatively connected to the second carriage means for imparting the reciprocating lateral motion to the second carriage means, the second lead screw being rotated by the second motor in a direction opposite to the direction of rotation of the first lead screw, the first and second wire guide means and the first and second carriage means jointly being adapted so that the respective motions imparted to the first and second carriage means are in opposite directions to one another and so that the first and second strands of wire cross one another while being wound on the bobbin, each time the respective first and second carriage means move past the longitudinal center of the bobbin.

20. The apparatus of claim 19 further comprising means for varying the speed of rotation of the first and second lead screws in accordance with a predetermined program, whereby the lateral motions of the first and second carriage means are controlled in accordance with the predetermined program.

21. The apparatus of claim 20 wherein the means for varying comprise computer means.

22. The apparatus of claim 20 further comprising a timing belt connected to a rotating output shaft of the second motor, the timing belt driving the first and second lead screws.

23. The apparatus of claim 22 further comprising idler pulley means operatively engaging the timing belt for reversing the direction of rotation of the second lead screw relative to the direction of rotation of the first lead screw.

24. The apparatus of claim 21 wherein the first motor drives the tailstock.

25. The apparatus of claim 24 further including means for applying a force in a direction parallel with the axis of rotation of the bobbin against the rotating tailstock whereby the rotating bobbin is kept under tension.

26. The apparatus of claim 25 wherein the means for applying force is an air cylinder.

27. A process for winding wire coils on a bobbin, the process comprising:

rotating the bobbin about its longitudinal axis;

moving a first wire guide laterally in a back and forth reciprocating motion relative to the rotating bobbin to guide a first strand of wire for winding on the bobbin, and simultaneously with the moving of the first wire guide, moving a second wire guide laterally in a back and forth reciprocating motion relative to the rotating bobbin to wind a second strand of wire on the bobbin, the second wire guide being always moved in a direction opposite to the direction of moving the first wire guide, the first and second wires crossing one another substantially in the middle of the bobbin as said strands of wire are being wound on the bobbin.

28. The process of claim 27 wherein each of the steps of moving the first and second wire guides, respectively, comprises moving said wire guides at a speed which varies along the axis of rotation of the bobbin.

29. The process of claim 28 further comprising the steps of laying a layer of insulator material on each layer of wire deposited on the bobbin, said laying of the insulator material being performed substantially when the first and second strands of wire cross one another.

30. The process of claim 29 further comprising the steps of substantially halting the rotation of the bobbin, and of the movement of the first and second wire guides while the step of laying the insulator material is performed.

* * * * *